United States Patent [19]

Stahl et al.

[11] 4,450,182

[45] May 22, 1984

[54] PROCESS FOR MODIFYING A DAIRY MEDIA FOR USE AS A FOAMING AGENT

[75] Inventors: Howard D. Stahl, Scarsdale; Raymond C. Yuan, North Tarrytown, both of N.Y.

[73] Assignee: General Foods Corporation, White Plains, N.Y.

[21] Appl. No.: 454,770

[22] Filed: Dec. 30, 1982

[51] Int. Cl.³ .............................................. A23C 3/04
[52] U.S. Cl. .................................. 426/565; 426/570; 426/580
[58] Field of Search ............... 426/570, 564, 580, 587, 426/565, 566, 567

[56] References Cited

U.S. PATENT DOCUMENTS

| | | | |
|---|---|---|---|
| 2,360,033 | 10/1949 | Baumann | 426/580 |
| 2,503,866 | 4/1950 | Chrysler | 426/580 |
| 2,708,632 | 5/1955 | Stimpson | 426/580 |
| 2,708,633 | 5/1955 | Stimpson | 426/580 |
| 2,874,050 | 2/1959 | Arenson | 426/580 |
| 3,979,526 | 9/1976 | Suzuki et al. | 426/570 |
| 4,352,828 | 10/1982 | Rialland | 426/580 |

*Primary Examiner*—Jeanette M. Hunter
*Attorney, Agent, or Firm*—Walter Scott; Thomas R. Savoie; Daniel J. Donovan

[57] ABSTRACT

Process for making a frozen foam by reducing the calcium activity of a dairy medium by at least about 70% and adding gum, carbohydrate and water. After adding a lipid sol, the mix is homogenized, cooled, whipped and frozen.

13 Claims, No Drawings

PROCESS FOR MODIFYING A DAIRY MEDIA FOR USE AS A FOAMING AGENT

It has long been desirable in the food art to find cost effective, naturally occurring emulsifiers and foaming agents for use in edible emulsions and foams. Emulsifiers and foaming agents are commonly used in many food products such as; high fat toppings, salad dressings, and non-butter fat dairy products. Some prior attempts have relied solely on the naturally occurring protein components of common foods. While these proteins have very desirable nutritive benefits, their use as emulsifiers and foaming agents has generally not been successful. Notably, lipoproteins effect the flavor of the product, or the amount of protein needed to obtain an emulsifying or foaming effect is too great. Thus, Lorant's findings, U.S. Pat. No. 3,431,117, that sodium caseinate functions well both as an emulsifier and as a foaming agent has made sodium caseinate very important to the food art. However, caseinate has drawbacks: the reason why some caseinates are not functional is not understood, and casseinate is expensive on a functional basis.

Chrysler et al., U.S. Pat. No. 2,503,866, discloses a process for producing a calcium-reduced skim milk to which butter fat is added back and then either dried or condensed to produce a product which, at its relatively concentrated proportions, possesses whipping properties. However, foams produced using this material as a whipping agent do not exhibit freeze-thaw stability. The present invention teaches a procedure for making a foaming agent from milk that imparts freeze-thaw stablity to these foams which incorporate this foaming agent.

SUMMARY OF THE INVENTION

This invention provides a process for making a foamed, oil-in-water emulsion through the use of a modified milk as a foaming agent. The emulsions of this invention are able to be whipped into stable foams having overruns well in excess of 200%, and are functional even when the emulsion system contains substantial amounts of other ingredients such as sugar, dextrins, texture modifiers, flavors, etc.

The method of the present invention uses a calcium-reduced, dairy protein foaming agent to prepare a freeze-thaw stable, foamed, oil-in-water emulsion. In a preferred embodiment of the instant invention, an ion exchange resin is used to remove calcium from an aqueous dairy media. Thereafter, the other emulsion ingredients are combined with this calcium-reduced dairy media. Notably, the dairy media is neither dried nor concentrated prior to this use. Subsequently, this dairy media and other ingredient mixture is homogenized and whipped into a foam.

DETAILED DESCRIPTION OF INVENTION

The process for making an edible foam begins by preparing the dairy foaming agent. Milk is a preferred aqueous dairy media from which the dairy foaming agent is prepared. Nevertheless, low fat milk is more preferred, and milk with less than 1% fat therein—for example, skim milk—is the most preferred dairy media to be processed so as to reduce the amount of calcium therein. Nonetheless, the term dairy media does not include purified milk fractions; e.g. albumins, caseins, etc., but does include reconstituted and enzymatically treated dairy media. Any means of reducing the dairy medium's calcium activity is within the scope of this invention, such as: by percipitation; by sequestering or chelating the calcium ions; by changing the calcium oxidation state, especially via electrochemical means; by selective removal of the low molecular weight material, for example by reverse osmosis membranes; by chromatographic methods, for example gel permeation or affinity chromatography; by ion exchange removal of the calcium in either a batch or continuous process; or by any combination of these methods. However, the preferred means of reducing the calcium activity is to actually remove the calcium ions from the aqueous dairy medium. The more preferred means for removing calcium from the milk is to use an ion exchange means, either batchwise or continuously. Moreover, continuous processing is further preferred to batch processing.

For ion exchange, it is preferred that the resin be a cation exchange resin, more preferred that it be a weakly acidic ion exchange resin, and it is most preferred that the resin's ion exchange groups be carboxylic acid resides. Furthermore, any resin backbone is acceptable, but it is preferred that the backbone be a cellulose, styrenedivinylbenzene, or an acrylic polymer, or modifications thereof. However, acrylic polymers, modified acrylic polymers, and combinations thereof are the more preferred as the resin backbones. Additionally, the resin should having an exchange capacity between about 0.01 and about 1000 milliqulivants per gram of dry resin, it is more preferred that the resin has an exchange capacity between about 0.1 and about 100 milliequlivants per gram and most preferredly, the resin has a capacity between about 0.5 and about 10 milliequlivants per gram.

The length to diameter ratio for the ion exchange resin column should be between about 1 and about 1000, more preferably between about 1.5 and about 100, and it is most preferred that this ratio be between about 2 and about 50. In any case, the resin bed should have a minimum height of about 5 centimeters. Furthermore, the resin bed should contain between about 1 and about 150 parts by weight of resin for each part of dairy media passed through the column per column use. It is preferred that between about 1 and about 100 parts resin are used for each part of dairy medium treated.

The resin is packed into the column by any means known in the chromatography art. After the resin is packed in the column, it is washed so as to meet the applicable standards for the use of this particular resin in food applications. Once the resin is so prepared, it is equilibrated between about pH 6.0 and about pH 10 with any alkaline solution. However, it is more preferred that the resin be equilibrated to a pH between about 6.2 and about 8.5 and it is most preferred that the resin be equilibrated to a pH between about 6.5 and about 8. Notwithstanding these preferences, it is further preferred that the resin is equilibrated in a manner effective to produce a pH between about 6.3 and 7.8 in the column effluent aqueous dairy media and it is still further preferred that the effluent dairy media have a pH between about 6.7 and about 7.4. Preferably, the equilibrating alkaline solution will be an aqueous solution of an alkali or an alkaline-earth metal salt such as the bicarbonates, carbonates, phosphates, and hydroxides. Alkali and alkaline-earth hydroxides are the more preferred equlibrating solutions and alkali hydroxides are the most preferred. It is still further preferred that equilibrating solution be sodium hydroxide, potassium hydroxide, or a combination thereof. It should be noted that the use of a calcium containing alkaline solution would inhibit the function of the resin in reducing the calcium content of any dairy media subsequently passed through the resin. It is preferred that the alkaline solution be between 0.001N and 10N, more preferably, the alkaline solution would be between 0.01N and 5N, and the most preferred alkaline solution would be between 0.1N and 3N. The equilibration of the resin column will normally be accomplished by addition of between about 1 and about 20 resin bed volumes of the alkaline solution, and more preferably between about 3 and about 7 resin bed volumes of the alkaline solution.

Once the column has been so prepared, the dairy media is passed through the resin bed at a flow rate between about 0.001 and about 10000 milliliters of dairy media per gram of resin per minute. It is more preferred that the flow rate be between about 0.1 and about 1000 milliliters of dairy media per gram of resin per minute and it is most preferred that the dairy media flow rate through the resin column be between about 0.1 and about 100 milliliters of dairy media per gram per minute. Moreover, more critical than the flow rate, is the reduced level of calcium activity. It is essential that the calcium activity of the dairy media is reduced by at least about 70%. It is more preferred that the calcium activity be reduced by at least about 85% and it is most preferred that the calcium activity be reduced by at least about 95%. However, it is further preferred the calcium activity of the dairy media be reduced by at least about 98% and it is still further preferred that more than 99% of the calcium activity be reduced.

When the resin has not been adjusted to produce the desired pH in the effluent dairy media, the dairy media effluent is typically unacceptably alkaline. Therefore, the pH of this dairy media is adjusted to between about 6 and about 8, more preferably it is adjusted to between about 6.5 and about 7.5 with an aqueous acid solution. So as not to dilute the protein level in the dairy media, it is preferred that the acid be at least about 0.001N, more preferred at least about 0.01N, but still less than about 5N. The acid used to adjust the dairy media's pH after calcium removal should be food approved, and it is more preferred that the acid be hydrochloric, acetic, citric, phosphoric, sulphuric, adipic, malic or a combination thereof. It is most preferred that the acid be hydrochloric, acetic, citric phosphoric, or a combination thereof.

When the calcium reduced dairy media is obtained by methods other than through ion exchange, it is preferred that this calcium reduced dairy media's pH be maintained between about 6 and about 8 and more preferably between about 6.5 and about 7.5. Furthermore, the non-ion exchange procedures should be conducted in a manner which does not cause milk proteins to percipitate.

The calcium activity reduced dairy media is combined with other ingredients to produce a foamed dessert topping. The other ingredients may include fat, emulsifiers, a non-protein stabilizer, carbohydrates, colorants, and flavoring agents.

The fat employed in preparing the frozen whipped topping compositions can be any of the natural animal or vegetable fats or oils commonly employed in food products. Thus any combination of edible oils, semi-solid or solid fats, can be employed. Such fats or oils may be fully or partially hydrogenated. Suitable fats include lard; modified lard; margarine; butter fat; modified butter fat, e.g. lipolyzed butter fat; as well as various vegetable and animal oils. Thus, oils such as coconut oil, palm kernal oil, cottonseed oil, peanut oil, olive oil, corn oil, and the like, may be utilized. Preferably, the fat is low melting and has desired melt-away characteristics at mouth temperatures.

A wide variety of emulsifiers may be employed in the compositions which are prepared by the process of this invention. Thus, hydroxylated lecithin, mono- or diglycerides of fatty acids such as monostearin and dipalmitin, polyoxyalkylene ethers of fatty esters of polyhydric alcohols such as the polyoxyethylene ethers of sorbitan monostearate or the polyoxyethylene ethers of sorbitan distearate; fatty esters of polyhydric alcohols, such as sorbitan monostearate; mono- and di-esters of glycols and fatty acids such as propylene glycol monostearate and propylene glycol monopalmitate; and partial esters of carboxylic acids such as lactic, citric, and tartaric acids with the mono- and di-glycerides of fatty acids such as glyceryl lactopalmitate and glyceryl lactooleate. The fatty acids employed in the preparation of the emulsifiers include those derived from beef tallow and coconut, cottonseed, palm, peanut, soybean and marine oils. Preferably, a combination of emulsifiers is employed, typically, polyoxyethylene sorbitan monostearate (polysorbate 60) and sorbitan monostearate.

A stabilizer, other than protein, is also desirably included in the frozen whipped topping composition. Such stabilizer is preferably a natural, i.e. vegetable or microbial; or synthetic gum and may be, for example, carrageenin, guar gum, alginate, xanthan and the like or carboxymethylcellulose, methylcellulose ether and the like, or a mixture thereof.

Carbohydrate is employed in the frozen whipped topping composition to provide desired sweetness and textural characteristics. Thus, sugars such as sucrose, dextrose, fructose, lactose, maltose, invert sugar, galactose, lactose hydrolyzates, and mixtures thereof and starch hydrolysates such as corn syrups, high fructose corn syrups, and maltodextrins may be utilized.

Additional ingredients which may be included in the frozen whipped topping compositions prepared by the process of this invention are flavoring agents, colorants or dyes, vitamins, minerals, and the like. Suitable flavoring agents include vanilla, chocolate, coffee, maple, spice, mint, butter, caramel and fruit flavors.

The amounts of fat, protein, emulsifier, stabilizer, carbohydrate, and optionally included ingredients as well as the amount of water employed in the preparation of frozen whipped topping compositions according to the process of this invention can be varied over relatively wide limits. The amount of fat will be sufficient to provide a stable whipped topping which has good mouth feel and yet, upon melting, does not leave an undesirable film on the palate. Sufficient amounts of protein, emulsifier and stabilizer will be used to afford some stability to the topping and to impart good whipping properties to the composition. Further, the amount of carbohydrate will be varied over a range sufficient to provide desired sweetness level in the finished topping composition. A preferred range of ingredients is as follows:

TABLE I

| Ingredients | Percent by Weight |
|---|---|
| Fat | 20.0–30.0 |
| Protein | 0.5–2.0 |
| Emulsifier | 0.3–2.0 |

TABLE I-continued

| Ingredients | Percent by Weight |
| --- | --- |
| Stabilizer (gum) | 0.05–2.0 |
| Water | 40.0–60.0 |
| Carbohydrate (sugar) | 20.0–30.0 |
| Flavoring agent | 0.1–2.0 |
| Colorant | 0.01–0.05 |

As has been indicated previously, the ingredients, including the carbohydrate and the optionally included ingredients, such as flavoring agent and color are blended in suitably desirable ratios to form a mix. The ingredients are heated prior to or during blending and the mix is then passed through a homogenizer of the typical dairy type. Although homogenization may be accomplished in one stage; for best results, homogenization is carried out in two stages, operated with the pressure maintained during the first stage at a minimum of $4.14 \times 10^8$ dynes per square centimeter (dyn/cm$^2$) and a maximum of about $6.89 \times 10^8$ dyn/cm$^2$, preferably about $5.17 \times 10^8$ dyn/cm$^2$, and the second stage at a pressure of about $3.45 \times 10^7$ dyn/cm$^2$. The mix temperature is usually maintained at a temperature of about 43° to 72° C., during homogenization. The emulsion is then cooled to about 0° to 25° C. and whipped to incorporate air or an inert gas such as nitrogen, carbon dioxide, nitrous oxide or the like. The whipping device may be any of conventional construction such as a Votator heat exchanger that permits cooling of the emulsion during whipping to temperatures of about 0° to about 10° C. The emulsion is then whipped to at least 200% overrun, packaged, and frozen.

Emulsions that do not whip to an overrun (OV) of at least 150% within four minutes are unacceptable. However, it is more preferred that the overrun be at least 200%. As overrun is a measure of foaming ability of air incorporation, low overruns indicate that the foaming agent is not satisfactory. The overrun of a foamed emulsion is defined by the following equation:

$$OV~(\%) = [100 \times \text{volume (ml)}]/[\text{mass (gm)}] - 100$$

The foam's viscosity is another evaluated parameter in determining foaming agent acceptability. The Brookflied Viscometer scale reading using a 36 mm T bar turning at 5 rpm is a measure of viscosity (VS) and preferably must be between 28 and 50, and more preferably between 34 and 42, if the foam is to have soft peaks and mimic dairy toppings. As consumers expect soft peaks, foaming agents that do not result in soft peaking foams are unsatisfactory.

The frozen whipped topping compositions produced by the present invention must also remain smooth after several freeze-thaw cycles and not curdle or deaerate upon prolonged freezer storage. While the compositions are distributed and sold in the frozen state, it is apparent that they could also merchandised in a refrigerated condition without loss of the advantageous features afforded by this invention. To use the frozen whipped topping composition, the product is defrosted, for example, by being left overnight in the refrigerator or left out at room temperature for two hours. The compositions after thawing are thus ready for immediate table use. With this pattern of use in mind, the freeze-thaw stability (F/T) of the product is evaluated by placing a defrosted sample in a refrigerator for 10 days. The foam's freeze-thaw stability is evaluated on the following criteria: coalesence of the incorporated air, viscosity, and synersis. A foam which is unacceptable with regard to any one or more criteria is deemed not freeze-thaw stable.

EXAMPLE 1

Four quarts of skim milk were pumped through a $32 \times 2$ centimeter glass column filled with an ion exchange resin. The resin was a weakly acidic ion exchange resin with carboxylic acid exchange groups. (Bio-Rex 70 (Trademark) from Bio-Rad Laboratories). Before use, the resin was equiliberated at pH 9.8 with a hydroxide solution. The flow rate of the milk through the column was adjusted so that the milk had a slight yellowish green color as it left the column and was about 10 ml/min. This color indicates that the milk's residence time in the column was sufficient to remove the exchangeable calcium. The pH of the calcium reduced skim milk after leaving the column was adjusted to pH 6.8 with 0.5N hydrochloric acid solution. A calcium analysis of the calcium reduced milk revealed that 95% of the calcium originally present in the milk had been removed.

A volume of the calcium reduced skim milk containing 15 grams of protein, as determined by a Kjeldahl analysis, was combined with the following ingredients:

TABLE II

| Ingredient | Quantity in grams |
| --- | --- |
| Sugar | 140.0 |
| Gum | 1.1 |
| Dextrose | 6.5 |
| Corn syrup | 105.3 |
| Polysorbate 60 | 3.4 |
| Flavors | 3.6 | plus water to bring the mass of the total mixture up to 744.4 grams. While the protein concentration of the calcium reduced milk will vary, it is anticipated that the quantity of milk needed will normally be approximately 400 grams.

Separately, 254.2 grams of hydrogenated coconut and palm oil are melted. To this melt, 1.4 grams of a lipophylic emulsifier, such as sorbitan monostearate, is added and the melt is mixed until the lipophylic emulsifier is thoroughly dissolved in the melted oil.

Once all the ingredients have been dispersed in each of the two separate solutions, aqueous and lipid, the two solutions are combined. The mixture is blended for 3–5 minutes in a Waring blender and then passed through a Manton-Gaulin homogenizer at a total pressure of 8000 psig. After homogenization, the emulsion is cooled to 4° C. and whipped for 2–4 minutes in a 5 quart Hobart mixer at maximum speed. The air incorporation and viscosity in the whip are then measured. The foam is then transferred into pint-size containers and frozen at −10° F. for freeze-thaw stability tests.

EXAMPLE 2

Example 2 followed the Example 1 procedure, except that after the ion exchange procedure, the Example 2 calcium reduced skim milk was spray-dried and then reconstituted with water so that 484.5 ml of milk contained 15 gms of protein.

EXAMPLE 3

A mixture of normal skim milk was combined with calcium reduced skim milk so that the mixture's calcium level was 40% of that in normal skim milk. This 40% calcium milk was used in making a foamed emulsion according to Example 1.

EXAMPLE 4

A normal skim milk and calcium reduced skim milk mixture containing 30% of the calcium in normal skim milk was used in making a foamed emulsion according to Example 1.

Table III compares Examples 1 through 4 on the three criteria for acceptable foaming agents: overrun, viscosity, and freeze-thaw stability. From these date it is apparant that a reduction in the calcium level of milk increases the functionality as a foaming agent so long as the milk is not dried.

TABLE III

|  | OV | Vis. | F/T |
|---|---|---|---|
| Example 1 | + | + | + |
| Example 2 | + | + | + |
| Example 3 | + | + | − |
| Example 4 | + | + | + |

EXAMPLE 5

The Rohn and Haas resin Amberlite IRC-50S, another carboxcylic exchange group, cation exchange resin, was used in the column of Example 1. However, before running the skim milk through the column, the column was adjusted to a sodium form with a pH of about 7.2 so as to produce a pH of about 7.0 in the skim milk effluent. Consequently, the calcium activity reduced skim milk was used as is: without adjusting the pH of the skim milk. An analysis of this milk revealed that 99+% of the calcium had been removed.

The calcium reduced skim milk of this example was then used to make a frozen foam according to Example 1. This produce exhibited excellent overrun, viscosity, and freeze-thaw stability.

EXAMPLE 6

The process of Example 5 is adapted to commercial scale.

EXAMPLE 7

A sample of commercial, spray-dried, calcium reduced (36% of a typical skim milk calcium level on a protein basis) skim milk (Western Dairys ®) containing 15 gm of protein was disolved in approximately 400 gm of water and this aqueous dispersion was substituted for the milk in Example 1.

EXAMPLE 8

The amount of milk powder in Example 7 was reduced by 20%, but otherwise the Example 7 modification of Example 1 procedure was followed.

EXAMPLE 9

The amount of milk powder in Example 7 was redcued by 35%, but otherwise the Example 7 modification of the Example 1 procedure was followed.

EXAMPLE 10

The amount of calcium reduced skim milk in Example 5 was reduced by 35%, but otherwise the Example 5 modification of the Example 1 procedure was followed.

The product of Examples 7, 8 and 9 had an appropriate overrun, and a viscosity which was slightly higher than the specification (a reading of 52 instead of 50 or less). Moreover, Examples 8 and 9 were stable for about 10 days after being defrosted and stored in a refrigerator. Thereafter, these samples exhibited a noticable syneresis and loss of texture (became webby). On the other hand, Example 10 had both an appropriate overrun and an appropriate viscosity. Quite surprisingly, Example 10 was stable in the refrigerator after defrosting for about 30 days before showing any notable syneresis or textural decay.

It is also within the scope of this invention to treat the dairy media with lactase enzyme so as to convert the lactose present in the dairy media to galactose and dextrose. This conversion is carried out subsequent to reducing the calcium activity of the dairy madia and may be either batchwise or continuous, i.e. immobilized lactase. As a result of this conversion, the foam composition requires less added carbohydrate to achieve the deisred sweetness and this conversion reduces the lactose intolerance problems of some consumers.

What is claimed:

1. A process for preparing a frozen foam composition containing a dairy medium and having an extended, thawed, refrigerated storage stability comprising the steps of:
   (a) reducing the calcium activity of the dairy medium by at least about 70%;
   (b) dispersing the reduced calcium activity dairy medium, an emulsifier, gum, and a carbohydrate in water;
   (c) preparing a lipid solution;
   (d) combining the aqueous dispersion of step b and the lipid solution of step c so as to form an admixture;
   (e) homogenizing said admixture at a pressure in excess of about 6000 psig so as to form an emulsion;
   (f) cooling said emulsion to a temperture effective to allow the lipid to crystallize;
   (g) whipping and aerating said cooled emulsion to an overrun of at least about 150% by volume; and
   (h) freezing said whipped emulsion.

2. A process according to claim 1 wherein the calcium activity is reduced by adding a calcium chelating agent.

3. A process according to claim 1 wherein the calcium activity is reduced by electrochemically changing the calcium oxidation state.

4. A process according to claim 1 wherein the calcium activity is reduced by selectively removing low molecular weight material from the dairy media.

5. A process according to claim 1 wherein the calcium activity is reduced chromatographically.

6. A process according to claim 1 wherein the calcium activity is reduced by exchanging non-calcium ions for calcium ions in the dairy media.

7. A process according to claim 6 wherein the dairy media ions are exchanged chromatographically.

8. A process according to claim 7 wherein the dairy media is skim milk.

9. A process according to claim 8 wherein at least about 85% of the skim milk calcium is removed.

10. A processing according to claim 6 which further comprises replacing the removed calcium ions with monovalent cations.

11. A process according to claim 1 which further comprises the step of removing calcium from the water before adding said water to said dispersion.

12. A process according to claim 1 which further comprises the step of converting the lactose present in the dairy media to galactose and dextrose.

13. A process according to claim 12 wherein the lactose conversion is carried out subsequent to reducing the calcium activity of the dairy media.

* * * * *